United States Patent [19]
Srivatsa et al.

[11] Patent Number: 5,876,559
[45] Date of Patent: Mar. 2, 1999

[54] DEINKING OF IMPACT AND NON-IMPACT PRINTED PAPER BY AN AGGLOMERATION PROCESS

[75] Inventors: Narendra R. Srivatsa, Ramsey, N.J.; Richard R. Wesolowski, Pine Island, N.Y.

[73] Assignee: International Paper Company, Tuxedo, N.Y.

[21] Appl. No.: 984,784

[22] Filed: Dec. 3, 1992

Related U.S. Application Data

[63] Continuation-in-part of Ser. No. 720,336, Jun. 25, 1991, abandoned.

[51] Int. Cl.⁶ .................................................. D21C 5/02
[52] U.S. Cl. ............................... 162/5; 162/8; 162/55; 162/75; 162/76; 162/77
[58] Field of Search ......................... 162/5, 55, 4, 8, 162/75, 76, 77

[56] References Cited

U.S. PATENT DOCUMENTS

| | | | |
|---|---|---|---|
| 3,069,308 | 12/1962 | Lissant | 162/5 |
| 3,808,089 | 4/1974 | Van Koeppen | 162/5 |
| 3,932,206 | 1/1976 | Illingworth | 162/5 |
| 4,013,505 | 3/1977 | Balcar | 162/5 |
| 4,076,578 | 2/1978 | Puddington et al. | 162/5 |
| 4,162,186 | 7/1979 | Wood | 162/5 |
| 4,231,841 | 11/1980 | Calmanti et al. | 162/5 |
| 4,276,118 | 6/1981 | Quick | 162/5 |
| 4,311,552 | 1/1982 | Brucato | 162/5 |
| 4,360,439 | 11/1982 | Calmanti et al. | 252/61 |
| 4,525,276 | 6/1985 | Toda et al. | 210/433.2 |
| 4,561,933 | 12/1985 | Wood et al. | 162/5 |
| 4,599,190 | 7/1986 | Maloney | 252/174.24 |
| 4,618,400 | 10/1986 | Wood et al. | 162/5 |
| 4,666,558 | 5/1987 | Wood et al. | 162/5 |
| 4,749,473 | 6/1988 | Shiori et al. | 209/164 |
| 4,820,379 | 4/1989 | Darlington | 162/5 |
| 4,883,603 | 11/1989 | Rogenstein et al. | 210/802 |
| 4,895,622 | 1/1990 | Barnett et al. | 162/199 |
| 4,919,754 | 4/1990 | Mollett et al. | 162/5 |
| 4,964,949 | 10/1990 | Hamaguchi | 162/5 |
| 5,102,500 | 4/1992 | Darlington | 162/5 |
| 5,141,598 | 8/1992 | Richman et al. | 162/5 |
| 5,200,034 | 4/1993 | Richmann et al. | 162/8 |

OTHER PUBLICATIONS

Surface Active Agents and Detergents, vol. II, Interscience Publishers, Inc, 1958, pp. 498–499.
B.D. Spark & J.E. Puddington, TAPPI, vol.59 No. 11, (Nov. 1976), pp. 117–119.
T.H. Quick & K.T. Hodgson, TAPPI, (Mar. 1986), pp. 102–106.
W.B. Darlington, TAPPI, (Jan. 1989), pp. 35–38.
McCool & Silveri, "Removal of Specks and Non–dispersed Ink from a Deinking Furnish", TAPPI 1987, Pulping Conference, pp. 33–40.
*Encyclopedia of Chemical Technology*, (3rd Ed.), vol. 22, "Surfactants and Detersive Systems", John Wiley & Sons, 1983, P362.

*Primary Examiner*—Peter Chin
*Attorney, Agent, or Firm*—Ostrager, Chong & Flaherty

[57] ABSTRACT

Deinking of impact and nonimpact printed paper is accomplished by repulping the printed paper in an alkali aqueous medium containing a deinking composition comprising one or more nonionic surfactants and/or alkanols. The presence of the deinking composition causes ink particles to agglomerate, which are removed from the aqueous medium by size and density separation. The invention provides an agglomeration method with high ink removal from all types of impact and nonimpact printed paper.

14 Claims, 1 Drawing Sheet

5,876,559

DEINKING OF IMPACT AND NON-IMPACT PRINTED PAPER BY AN AGGLOMERATION PROCESS

SPECIFICATION

This application is a continuation-in-part of application Ser. No. 07/720,336, filed on Jun. 25, 1991 now abandoned.

FIELD OF INVENTION

This invention generally relates to a method to deink impact and nonimpact printed paper. More particularly, it concerns a process which deinks impact and nonimpact printed paper by agglomeration of ink particles through treatment with deinking compositions comprising one or more nonionic surfactants and/or alkanols. Size and density separation procedures are used to remove agglomerated ink particles. Preferably, the deinking compositions comprise one or more C5 to C20 alcohol ethoxylates having an ethoxylate content sufficient to provide detergency or wetting. Alternatively, the deinking compositions comprise one or more C5 to C20 alkanols or blends with the alcohol ethoxylates.

BACKGROUND ART

In the past paper was printed with primarily water or oil based inks which were satisfactorily removed by conventional deinking procedures. In conventional deinking procedures, the paper is mechanically pulped and contacted with an aqueous medium containing a deinking chemical. The pulping and presence of the deinking chemical resulted in a separation of the ink from the pulp fibers and the dispersed ink is then separated from the pulp fibers by washing or flotation processes.

Today, increasing amounts of printed paper are generated from electrophotographic processes such as xerography and non-impact printing processes such as laser and ink-jet printing. Deinking processes capable of deinking these types of printed paper are very complex and are capital intensive. In addition, multiple steps are required for debris removal and actual ink removal. Generally, ink removal procedures involve washing, flotation, forward cleaning and high consistency dispersion to reach the level of speck removal and brightness required in the deinked pulp to create recyclable paper.

U.S. Pat. No. 4,561,933 to Wood, discloses a process for deinking xerographically printed wastepaper. Repulped printed wastepaper is treated with a deinking agent consisting of a mixture of alkanols and alcohol ethoxylates to produce a suspension of ink particles. The suspended ink particles are separated from the resulting pulp-medium by washing and flotation process steps. The deinking chemical and process in Wood, however, is limited to deinking only xerographic waste and utilizes multiple process steps to separate the ink.

To surmount these limitations, and as an alternative to conventional deinking procedures, the prior art has shown use of agglomeration deinking processes. Agglomeration chemicals consisting of polymeric systems and surfactant systems are employed to aid in the ink agglomeration process. In deinking paper through agglomeration the waste paper is repulped and then deinked through chemical treatment to provide a slurry of pulp and ink agglomerates. The ink agglomerates are removed from the pulp by sedimentation and separation. However, the polymeric and surfactant systems used in these agglomeration processes are specific to certain types of inks. See U.S. Pat. No. 4,820,379 to Darlington (polymeric system) and U.S. Pat. No. 5,141,598 to Richman et al. (surfactant system), in which the deinking compositions are specific for agglomeration of electrostatic inks, and U.S. Pat. No. 4,076,578 to Puddington et al. (polymeric system) in which the deinking chemical is specific for agglomeration of newspaper inks.

Therefore, known deinking processes are not entirely satisfactory in that the chemicals used are selective as to the type of ink. Also high concentrations of expensive chemicals are necessary to obtain effective deinking results. Such processes are cost inefficient.

Thus the present practice, employing known deinking processes and agglomeration chemicals, has problems in deinking a wide variety of impact and non-impact printed paper. The inventions and practice to date, deal with deinking chemicals having limitations to specific inks and deinking processes which require complex and expensive procedures to obtain recyclable grade paper.

There is a need in the art for deinking processes which cause agglomeration of all types of inks, both impact and nonimpact, for all grades of paper. This invention is directed to the provision of such processes which have wide range applications in creating recyclable grade paper. It would be appreciated that advantage over conventional deinking procedures would be obtained by providing an effective and efficient deinking method applicable to all types of printed paper.

Accordingly, it is a broad object of the invention to provide a deinking process utilizing a deinking composition for the agglomeration of all types of inks, both impact and nonimpact, from wood containing and wood free grades of paper.

A more specific object of the invention is to provide a deinking method which utilizes agglomeration deinking compositions comprising one or more nonionic surfactants and/or alkanols for the agglomeration of all types of inks, both impact and nonimpact, from wood containing and wood free grade of paper.

A further specific object of the invention is to provide deinking compositions comprising one or more C5 to C20 alcohol ethoxylates having an ethoxylate content sufficient to provide detergency or wetting.

Another more specific object of the invention is to provide deinking compositions comprising one or more C5 to C20 alkanols or a composition comprising a blend with the alcohol ethoxylates.

Another object of the invention is to provide a low cost agglomeration deinking process that effectively and efficiently removes ink without using a high concentration of expensive agglomeration chemicals.

A further specific object of the invention is to provide an agglomeration deinking method which is less complex than the prior art ink removal procedures.

Another object of the invention is to provide a recycled paper product made by the agglomeration deinking method of the invention from impact and/or nonimpact printed paper.

A further specific object of the invention is to provide an apparatus for deinking impact and/or nonimpact printed paper utilizing a repulping means, an agglomeration means, a separation means and a production means to produce recyclable grade paper.

DISCLOSURE OF INVENTION

In the present invention, these purposes, as well as others which will be apparent, are achieved generally by providing a deinking process which deinks impact and nonimpact printed paper by agglomeration and density separation of ink particles. The deinking process comprises the steps of repulping the printed paper in an alkali aqueous medium containing a deinking composition, which causes the ink particles to agglomerate to produce an ink pulp medium, and removal of the ink particles from the ink pulp medium by size and density separation to produce a substantially ink free pulp medium. The substantially ink free pulp medium can then be made into a recycled paper product through conventional papermaking processes.

The deinking composition used in the invention is an agglomeration deinking composition comprising one or more nonionic surfactants and/or alkanols, wherein the composition provides hydrogen bonding, surface wetting and emulsification functionalities to cause agglomeration of the ink particles. The agglomeration method and deinking compositions in the present invention are related to the agglomeration process and deinking compositions disclosed in co-pending application Ser. No. 07/720,336, filed on Jun. 25, 1991.

A preferred deinking composition used in the invention comprises a mixture of one or more C5 to C20 alcohol ethoxylates having an ethoxylate content sufficient to provide detergency or wetting. Typically, the ethoxy (EO) group to alcohol, mole/mole average ratio of the preferred deinking composition range from 0.001 to 12. Hydrophobicity of the composition as measured hydrophobic-hydrophilic balance (HLB) values range from 0.5 to 12. The cloud point of the composition is less than 200° F. and hydroxyl values (expressed as eq./100 g) are greater than 0.0001. The specific gravity of preferred deinking composition is similar to water.

Further preferred embodiments of the deinking composition have HLB values ranging from 0.5 to 6, ethoxy group to alcohol, mole/mole avg. ratio ranging from 0.1 to 5, cloud points in the range of 5° to 100° F. and a hydroxyl value between 0.1 and 1.

Alternatively, the deinking composition comprises one or more C5 to C20 alkanols, or a mixture with the alcohol ethoxylates wherein for every 10 parts of the composition mixture there is between 8 and 3 parts alkanols and between 2 and 7 parts alcohol ethoxylate. These compositions have the same chemistry as the preferred deinking composition.

In yet another embodiment of the invention, the deinking compositions further comprises one or more $C_5$–$C_{20}$ alkanols and the nonionic surfactant is selected from the group comprising of polyakyleneoxy ether, polyoxyalkylether, poloxyethylenephenol ether, oxyethylene-oxypropylene block copolymer, polyoxyethylenealkylamine, sorbitan fatty acid ester, polyoxyethylenesorbitan fatty acid ester, polyethylene glycol esters and diesters or any other nonionic surface active agents with wetting power to reduce the surface tension of water molecules.

The deinking compositions of the invention provide strong hydrogen bonding, surface wetting and emulsification functionalities to form or facilitate bridges between the ink particles and to agglomerate or coalesce them for subsequent removal by size and density separation procedures.

Process and reaction conditions are controlled during contact with the deinking composition so that effective agglomeration of the ink particles is accomplished. Concentrations of the deinking composition, as well as the pH and temperature of the aqueous medium are adjusted to yield maximum agglomeration of the ink particles. After agglomeration, the pulp-containing medium is passed through slotted screens and a number of forward cleaners to remove coarse contaminants and agglomerated ink particles by size and density separation. The resulting pulp slurry has a speck removal and brightness level sufficient to produce high-grade recyclable paper.

Preferred applications of the method of the invention include use in deinking impact and nonimpact printed paper to produce high-grade recyclable paper. Advantageously, the invention provides agglomeration deinking compositions and related process that are more effective and less complex and expensive than known agglomeration compositions and processes.

The invention also provides an apparatus for deinking impact and/or nonimpact printed paper utilizing a repulping means, an agglomeration means, a separation means and a production means to produce recyclable grade paper.

Other objects, features and advantages of the present invention will be apparent when the detailed description of the preferred embodiments of the invention are considered in conjunction with the drawings, which should be construed in an illustrative and not limiting sense as follows:

DETAILED DESCRIPTION OF THE PREFERRED EMBODIMENT

As used in this specification the terms impact and nonimpact printed paper refer to paper printed by impact processes as in offset printing or other mechanical printing and nonimpact processes as in laser printing, photocopying or other processes where the ink is fused onto the paper.

Figure 1:
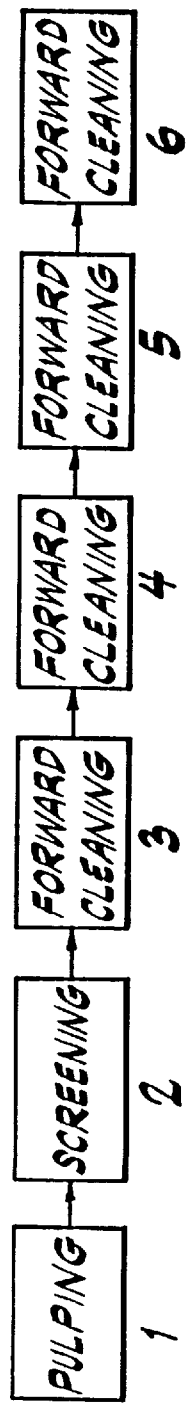
FIG. 1 is a diagrammatic view of the process for deinking of impact and nonimpact printed paper.

With further reference to the drawings, FIG. 1 is a diagrammatic view of the process steps for the deinking of impact and nonimpact printed paper.

At station 1, pulping of the printed paper is effected in the presence of a deinking composition of the invention which causes the ink particles to agglomerate to produce an ink pulp medium. The ink pulp medium is then passed through slotted screens at station 2 to remove coarse contaminants such as staples, dirt or other debris. The agglomerated ink particles are removed by size and density separation at forward cleaning stations 3 and 4, and if necessary 5 and 6, to yield a substantially ink free pulp medium sufficient to produce high-grade recyclable paper.

Figure 2:
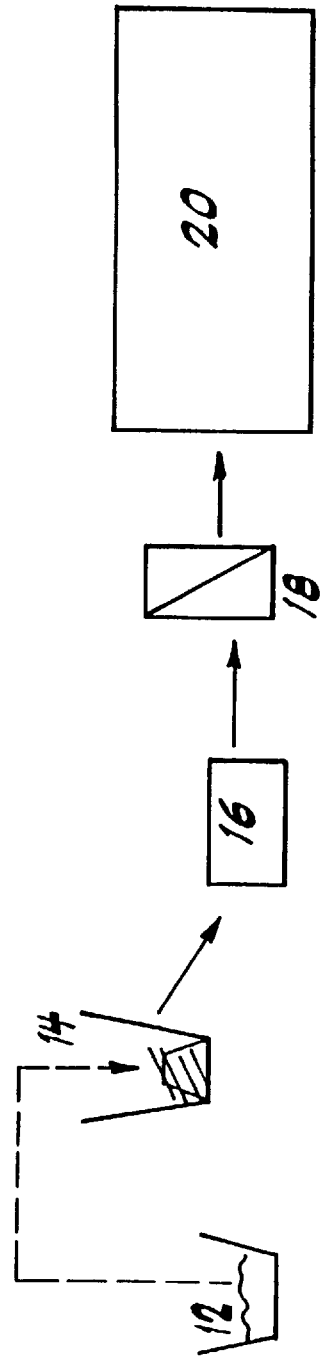
FIG. 2 is a schematic view of the apparatus for deinking of impact and nonimpact printed paper.

FIG. 2 is a schematic view of an apparatus, generally 10, for the deinking process of the invention. The process of the invention entails repulping the wastepaper with the deinking composition in aqueous medium at above ambient temperature, separating the ink from the fiber and agglomerating the ink to a size and density for removal by screening and forward cleaning.

The printed paper is repulped in an alkali aqueous medium at hydrapulper, 14. In a preferred embodiment of the invention, the printed paper is cellulosic material including both wood containing and wood free grades of paper. Table I presents various types of printed paper which may be used in this invention. This table is representative of the different types of printed paper and is not considered to be inclusive of all the possible types of printed paper which may be used in the invention.

TABLE I

TYPES OF PRINTED PAPER

COMPUTER PRINTOUT PAPER
WRITING PAPER
FINE PAPER
COATED MAGAZINE PAPER
UNCOATED MAGAZINE PAPER
COATED PUBLICATION GRADES
MANILA FILE FOLDERS
NEWSPRINT
PACKAGING BOARD

Deinking compositions of the invention, 12, are added to the pulp-containing medium to cause agglomeration of the ink particles to produce an ink pulp medium. Preferably the pulping of the printed paper is carried out at consistency ranges between 3–30%, at a pH range between 6 to 11.5, maintained at a temperature between 30° to 80° C. for 10 to 90 minutes.

The deinking composition used in the invention comprises one or more nonionic surfactants and/or alkanols, wherein the composition provides hydrogen bonding, surface wetting and emulsification functionalities to cause agglomeration of the ink particles. The agglomeration method and deinking compositions in the present invention are related to the agglomeration process and deinking compositions disclosed in co-pending application Ser. No. 07/720,336, filed on Jun. 25, 1991.

All nonionic surfactants contain both hydrophobic and hydrophilic groups, with the ratio of the respective weight percentages of these groups influencing the emulsification behavior of the particular surfactant. The solubility characteristics of the nonionic surfactants in water are characterized in terms of their hydrophile-lipophile balance (HLB) values. A high HLB indicates that the hydrophilic portion of the surfactant is dominant, while a low HLB indicates that the hydrophobic portion of the molecule is dominant. The water solubility of the surfactant increases with increasing HLB values. HLB values are generally indicative of the type of emulsion but the efficiency of the emulsification varies depending on temperature, pH and other process variables.

Critical to the process of the present invention is the hydrophobicity, surface wetting and emulsification properties of the present compositions which provide a liquid bridging functionality resulting in the agglomeration of the ink particles. Most ink particles are naturally hydrophobic. The deinking compositions of the invention provide interaction between [ink—deinking chemical—ink—water] in which the deinking agent acts as a "liquid bridging agent" that separates the ink particles from the paper and causes them to agglomerate in the pulp medium. Ink particles denser than water, and typically as large as ¼" (6000$\mu$) or greater, are formed which are effectively removed by screening and forward cleaning procedures.

The invention composition and agglomeration process are distinct from washing and flotation procedures. In washing procedures the ink particles stay dispersed in the water phase and leave the fiber behind. The ink particles are chemically altered so they "like" to stay in water, making them hydrophilic. Washing procedures generally remove ink particles less than 15$\mu$. In flotation processes the ink is selectively adsorbed onto air bubbles rendered hydrophobic. Ink particles adhere to the air bubbles and float to the surface, forming a froth which can be skimmed off. Flotation processes are generally limited to removing only particular types of printed inks and particularly ink particles in the range of 10 to 100 microns. See McCool and Silveri, TAPPI 1987 Pulping Conference, particularly FIG. 16.

The compositions may be comprised of alcohol ethoxylates, mixtures of alcohol ethoxylates and alkanols, or even in certain instances alkanols, with the HLB values of the compositions ranging from 0.5 to 12 and cloud points less than 200° F. The hydrophobic nature, surface wetting and emulsification properties of the compositions provide hydrogen bonding functionalities that facilitate bridges between the ink particles causing them to coalesce or agglomerate into larger ink particles. The nature of the compositions are affected by the concentration of the composition components, pH, temperature and pulp fiber consistency, with these variables being adjusted according to the composition components used to maximize agglomeration of the ink particles from various types of wastepaper.

A preferred deinking composition used in the invention comprises one or more C5 to C20 alcohol ethoxylates having an ethoxylate content sufficient to provide detergency or wetting. Typically, the ethoxy (EO) group to alcohol, mole/mole average ratio of the preferred deinking composition range from 0.001 to 12. Hydrophobicity of the composition as measured hydrophobichydrophilic balance (HLB) values range from 0.5 to 12. The cloud point of the composition is less than 200° F. and hydroxyl values (expressed as eq./100 g) are greater than 0.0001. The specific gravity of preferred deinking composition is similar to water.

Further preferred embodiments of the deinking composition have HLB values ranging from 0.5 to 6, ethoxy group to alcohol, mole/mole avg. ratio ranging from 0.1 to 5, cloud points in the range of 5° to 100° F. and a hydroxyl value between 0.1 and 1.

Alternatively, the deinking composition comprises one or more C5 to C20 alkanols or a mixture with the alcohol ethoxylates, wherein for every 10 parts of the composition mixture there is between 8 and 3 parts alkanols and between 2 and 7 parts alcohol ethoxylate. The compositions have the same chemistry as the preferred deinking composition.

In yet another embodiment of the invention, the deinking compositions further comprises one or more $C_5$–$C_{20}$ alkanols and the nonionic surfactant is selected from the group comprising of polyakyleneoxy ether, polyoxyalkylether, poloxyethylenephenol ether, oxyethylene-oxypropylene block copolymer, polyoxyethylenealkylamine, sorbitan fatty acid ester, polyoxyethylenesorbitan fatty acid ester, polyethylene glycol esters and diesters or any other nonionic surface active agents with wetting power to reduce the surface tension of water molecules.

The deinking compositions of the invention provide strong hydrogen bonding functionalities to form or facilitate bridges between the ink particles and to agglomerate or coalesce them. The deinking compositions cause ink particles to agglomerate to sizes as large as ¼" (6000$\mu$) or greater for subsequent easy removal by size and density separation procedures.

The repulping is typically carried out in the consistency range of 3 to 30% with 0.1 to 2% deinking chemical, at a pH between 6 to 11.5, maintained at a temperature between 40° to 80° C. for 10 to 90 minutes to form ink agglomerates of various sizes. During the repulping step the addition of wastepaper, alkali and deinking chemical is simultaneous. A preferred sequence, however, is to heat the water to a repulping temperature between 50° to 70° C., adding the deinking chemical in an amount between 0.1 and 1% by weight of paper, and adjusting the aqueous medium to a pH between 6.5 and 10.5 by the addition of alkali followed by the addition of wastepaper in a consistency between 5 to 20%.

The repulping is accomplished by a hydrapulper, kneader or other similar apparatus. The repulping time of the wastepaper ranges from 10 to 60 minutes; preferably between 20 to 40 minutes. The optimum pulping action is a gentle mechanical action sufficient to defiber the wastepaper as in a kneader.

After repulping, the ink pulp medium is passed to dump chest 16, and through slotted screens 18, to remove large agglomerated ink balls, any plastic, adhesives, flakes, staples or other coarse contaminants.

The ink pulp stock is passed through coarse screens having large holes to remove large debris and ink, followed by fine screens to remove the smaller ink particles and contaminants. The screening is typically carried out at consistencies in the range of 0.3 to 3.0%, temperatures between 25°–55° C., and maintained at a pH range between 6.0 and 9.0. The screens used may also be pressurized to aid in the removal of coarse contaminants. Alternatively, a reverse cleaning step may be used after this screening step to remove lightweight contaminants and lighter ink.

After removal of the coarse contaminants the ink pulp medium is passed through a series of forward cleaning stations, 20, where agglomerated ink particles are removed by density separation to produce a substantially ink free pulp medium. The forward cleaning stations remove the agglomerated ink particles which are denser than water. Following the forward cleaning step the substantially ink free pulp medium is thickened, using thickeners such as in a sidehill or gravity decker, to yield a pulp slurry sufficient to produce high-grade recyclable paper.

This forward cleaning step is done at consistencies in the range of 0.3 to 3.0% using multiple primary forward cleaners arranged in series. Alternatively, these forward cleaners could be arranged in a primary-primary, primary-secondary, tertiary or quartenary arrangement. In a primary-primary arrangement the treated repulped stock is passed through two sets of forward cleaners. The forward cleaners employed in the invention are standard industry forward cleaners and remove the ink agglomerates by density separation. In a primary-secondary arrangement the ink pulp stock is passed through a forward cleaner and the reject material is passed through a secondary cleaner. The reject material from the secondary cleaner is passed through a tertiary cleaner whose rejects are then passed through a quartenary cleaner. A quartenary arrangement provides the highest fiber yield.

In the following Examples, deinking of impact and non-impact printed paper was obtained by the process line as shown in FIG. 2. The printed wastepaper was repulped in the presence of a deinking composition which caused the ink particles to agglomerate to produce an ink pulp medium. Removal of the ink particles from the ink pulp medium was achieved by size and density separation by passing through screens, separatory funnels and/or forward cleaning stations to produce a substantially ink free pulp medium.

Examples I through XVII below, show various types of impact or nonimpact printed wastepaper treated with the deinking composition and process steps of the invention. Generally, the deinking compositions used in the Examples comprise one or more nonionic surfactants. In particular, Examples I to X and XV the deinking composition comprise one or more $C_5$–$C_{20}$ alkanols and nonionic surfactants; Examples XI to XIV comprise one or more $C_5$–$C_{20}$ alcohol ethoxylates having an ethoxylate content sufficient to provide detergency or wetting; and Example XVI comprise a blend of $C_8$–$C_{10}$ alkanols. These Examples are merely representative and are not inclusive of all the possible embodiments of the invention.

EXAMPLE I 180 pounds (dry) of printed paper consisting of approximately 60% nonimpact ink, 35% impact ink and a small mixture of flexographic and UV inks, was repulped in the presence of a deinking chemical in a high consistency hydrapulper for 30 minutes at 5.9% consistency, at a pH of 10.0, maintained at 70°. The ink pulp medium was passed through a 0.1" slot vibrating flat screen at 1% consistency, 45° C. and then through a total of four passes of forward cleaning stations. The forward cleaner used was a 5" Hymac, run at 0.8% consistency and 45° C. with a reject rate of 20% in the first pass of forward cleaning and 10% in subsequent passes of forward cleaning.

The deinking composition used in this Example was a mixture of one or more $C_8$–$C_{16}$ alkanols and alcohol ethoxylates, where for every 10 parts by weight of alkanol and alcohol ethoxylates there are between 3.3 and 6.0 parts alkanol and between 4.0 and 6.7 parts alcohol ethoxylates. The ratio of alkanols to alcohol ethoxylates is approximately 1:1 with the deinking composition having an HLB value of approximately 10.

Samples were collected after the following process steps: after repulping, (for use as a control); after screening, (screen rejects and screen accepts); and after each forward cleaning pass (cleaner accepts and rejects).

Table II lists the agglomeration deinking results of the above samples collected using the deinking composition of Example I. The dirt count and % dirt removal refers to the ink count and removal and is set forth in Table II after each step in the agglomeration process. Standard Technical Association of the Pulp and Paper Industry ("TAPPI") procedure numbers T437 (paper and paperboard) and T213 (pulp) were used to measure dirt count and removal. The TAPPI procedure refers to any visible speck above 0.04 mm$^2$ as dirt.

TABLE II

EXAMPLE I
AGGLOMERATION DEINKING RESULTS

| CHEMICAL | PROCESS STEP | DIRT COUNT (ppm) ±2 STANDARD DEVIATIONS | % DIRT REMOVAL IN STEP |
| --- | --- | --- | --- |
| NONE | PULPER | 4029 (±736) | 0 |
| NONE | SCREEN | 4753 | 0 |
| NONE | CLEANER | 2053 | 57 |
| NONE | CLEANER | 1413 | 31 TOTAL 65 |
| DEINKING | PULPER | 4500 (±736) | 0 |
| DEINKING | SCREEN | 1710 | 62 |
| DEINKING | CLEANER | 350 | 80 |
| DEINKING | CLEANER | 296 | 15 TOTAL 93 |

A control was run with no deinking composition and yielded a total dirt removal of 65% at the end of the second pass of forward cleaning. Most ink removal occurred after the first pass of forward cleaning (57%) with the screening step removing virtually no ink. The screening step did remove coarse contaminants and some stickies based on visual examination of the rejects.

The results in Table II show that treatment with the deinking composition achieved an accepts dirt count of 350 ppm after the first pass of forward cleaning and 296 ppm after the second pass of forward cleaning. The dirt removal efficiency after the screening step was 62%, 80% after the first pass of forward cleaning and 15% after the second pass of forward cleaning. Total dirt removal after the second pass of forward cleaning was approximately 93%.

EXAMPLE II

Offset printed paper was repulped separately at a 5 and 15% consistency with 1% by weight of the deinking composition of Example I added at 70° C. and a pH of 10.5. The ink separated easily from the paper and agglomerated to sizes as large as ¼" (6000µ) which were then removed by density separation in a separatory funnel.

EXAMPLE III

Laser printed paper was repulped separately at 5 and 15% consistency, with 1% by weight of the deinking composition of Example I at 70° C. and a pH of 10.5. The ink separated easily from the paper and agglomerated to sizes as large as ¼" (6000µ) which were then removed by density separation in a separatory funnel.

EXAMPLE IV

Wastepaper containing 25% offset printed paper and 75% laser printed paper was repulped at 5 and 15% consistency, with 1% by weight of the deinking composition of Example I at 60° C. and a pH of 10.0. The ink separated easily from the paper and agglomerated to sizes as large as ¼" (6000µ) which were then removed by density separation in a separatory funnel.

EXAMPLE V

Wastepaper containing 75% offset printed paper and 25% laser printed paper was repulped at 5 and 15% consistency, with 1% by weight of the deinking composition of Example I at 60° C. and pH of 10.5. The ink separated easily from the paper and agglomerated to sizes as large as ¼" (6000µ) which were then removed by density separation in a separatory funnel.

EXAMPLE VI

Wastepaper containing a mixture of 50% impact ink, 45% nonimpact ink and a small mixture of UV and flexographic ink was repulped at 5.0% consistency, with 1% by weight of the deinking composition of Example I at 70° C. and a pH of 10. The pulp containing medium was then screened and sent through two passes of forward cleaning. The ink removal at the end of this sequence was 99.6%.

EXAMPLE VII

Wastepaper containing news and magazines in a 1:1 blend was repulped at 15% consistency with 1% by weight of the deinking composition of Example I at 70° C. and a pH of 10.5. The ink separated easily from the paper and agglomerated to sizes as large as ¼" (6000µ) which were then removed by density separation in a separatory funnel.

EXAMPLE VIII

Wastepaper containing a mixture of 50% impact ink, 45% nonimpact ink and a small mixture of UV and flexographic ink was repulped at 5.0% consistency, with 1% by weight of the deinking composition of Example I at 55° C. and a pH of 10. The pulp containing medium was then screened and sent through two passes of forward cleaning. The ink removal at the end of this sequence was 92.7%.

EXAMPLE IX

Wastepaper containing a mixture of 25% impact ink, 70% nonimpact ink and a small mixture of UV and flexographic ink was repulped at 7.0% consistency, with 1% by weight of the deinking composition of Example I at 45° C. and a pH of 11.5. After repulping the pulp containing medium was found to contain 77% less dirt. The small ink particles agglomerated to sizes as large as ¼" (6000µ) and separated from the pulp medium.

EXAMPLE X

Laser printed paper was repulped separately at 5 and 15% consistency, with 1% by weight of the deinking composition of Example I at 65° C. and a pH of 8.0. The ink separated easily from the paper and agglomerated to sizes as large as ¼" (6000µ) which were then removed by density separation in a separatory funnel.

EXAMPLE XI

The deinking composition used in this Example comprised alcohol ethoxylates with lower cloud points, lower ethoxy/alcohol mole/mole average ratios, lower HLB values and higher specific gravity and hydroxyl values than the previous Examples. The composition used comprised Neodol 23-1®, from Shell Chemical Company, Houston, Tex. Specifically the deinking composition has an ethoxy/alcohol mole/mole average ratio of 1, a HLB value of 3.7, a cloud point (1% aqueous solution) of 13.6° F.; a specific gravity of 0.873 and a hydroxyl value of 0.42 eq./100 g.

Non-impact printed white paper was shredded to approximately 1"×1" pieces to a 3% consistency. The starting size of the ink particles was less than 100µ and were largely flat. 0.06 ml of the deinking composition was added to 13.5 gms. of the paper slurry and stirred for approximately 1 hour at 60° C. The ink particles agglomerated to sizes as large as ⅜" (9500µ).

EXAMPLE XII

Same deinking composition and procedure as Example XI was followed, except green colored wastepaper was used.

The treatment with the deinking chemical resulted in the same agglomeration phenomena as in Example XI, with ink particles measured up to ⅜" to 1" (19,000 to 25,000µ).

EXAMPLE XIII

The procedure of Example XI was modified to slush the paper in a Waring blender to defiber the paper. The wastepaper used in this example was ledger grade run through a Kodak photocopier. The same deinking composition as Example XI was used.

The wastepaper was repulped in a Waring blender set at the highest speed for 1 minute at approximately 5% consistency, i.e. 50 gms of wastepaper in 1000 ml hot tap water. The repulped ink particles were less than 100µ in size. 600 ml of this paper slurry was diluted to 800 ml and 0.05 ml of the deinking composition was added. The mixture was stirred for 1 hour at 60° C. The ink particles agglomerated to sizes as large as ⅜" (9500µ).

EXAMPLE XIV

Same procedure followed as in Example XIII except that commercial laser computer printout grade wastepaper was used. The ink particles in the repulped wastepaper were less than 100μ. The ink particles agglomerated to particle sizes as large as ¼" (6345μ).

EXAMPLE XV

The deinking composition used in this example comprised a mixture of $C_{12}$–$C_{16}$ alcohol ethoxylates and $C_{10}$–$C_{12}$ alkanols in a ratio of 1:2 alcohol ethoxylates to alkanols.

Twenty (20) pounds of laser computer printout paper was repulped in 30 gallons of water at 70° C. in the presence of 30 ml's of the deinking composition for 30 minutes. The deinking composition comprised 10 ml of Alfonic™ 1216-22, $C_{12}$–$C_{16}$ alcohol ethoxylates from Vista Chemicals, Houston, Tex., and 20 ml of Alfol™ 1012, blend of $C_{10}$–$C_{12}$ alkanols from Vista Chemicals, Houston, Tex.

A control sample was run without the deinking composition. The sample treated with the deinking composition showed that ink particles agglomerated easily. In addition, a 45% speck count reduction with a 1.9 points G.E. brightness was achieved as compared to the control sample.

The alcohol could be added up to a dosage at which it remains miscible in the surfactant—water phase. The presence of the alcohol improves the hydrophobicity of the system and enhances the liquid bridging functionality by promoting hydrogen bonding.

EXAMPLE XVI

The deinking composition used in this example comprised a blend of $C_8$–$C_{10}$ alkanols. Alfol™ 810, blend of $C_8$–$C_{10}$ alkanols from Vista Chemicals, Houston, Tex. was added to old newsprint at 0.3% by weight of oven dry wastepaper, and repulped at 3% consistency, 50° C. for 45 minutes.

A control sample was run without the deinking composition. The sample treated with the deinking composition showed a brightness increase of 4 points G.E. with few dirt specks as compared to the control sample.

Certain impact type inks, including newsprint, can be agglomerated without the alcohol ethoxylate or surfactant functionality. The minimum alcohol required in these instances would be 0.01% by weight of oven dry wastepaper, however, the alcohol ($C_5$–$C_{20}$) could be added up to a dosage at which it remains miscible in the water phase.

EXAMPLE XVII

The deinking composition of Example I was added to laser computer printout in the amount of 0.8% by weight of oven dry wastepaper. This sample was repulped in two separate instances at 55° C. and at 70° C. The repulped sample was treated to screening (fine slots) and two stages of forward cleaning. The dirt removal at 55° C. was 92.8% and at 70° C. was 99.6%. The higher temperature helps in softening the ink and improves the micellar effect of the surfactant system.

As shown in Examples I through XVII a variety of impact and nonimpact printed wastepaper were treated with the agglomeration deinking compositions and process steps of the invention under varying process and reaction conditions. In general, all the examples showed effective agglomeration of ink particles which were easily removed from the ink pulp medium by size and density separation methods to produce a substantially ink free pulp medium. The substantially ink free pulp medium has speck removal and brightness levels sufficient to produce high-grade recyclable paper through conventional papermaking processes.

The simplicity of the equipment used and the high amount of dirt removal, approximately 93%, make the agglomeration deinking process of the invention advantageous over prior art practice. Modifications to the agglomeration process involving finer screening apparatus can be employed to further reduce the final dirt count.

Advantageously, the method of this invention for deinking both impact and nonimpact printed paper is less complex than conventional deinking processes involving washing and flotation procedures. The utilization of relatively simple treatment process steps and deinking compositions which cause agglomeration of both impact and nonimpact printed paper provide a simple and low cost deinking process for all grades of paper.

It will be recognized by those skilled in the art that the invention has wide application in deinking a variety of impact and nonimpact printed paper to produce recyclable grade paper.

Numerous modifications are possible in light of the above disclosure such as application of alternative agglomeration deinking compositions. Strong collector chemicals selected from the group comprised of polyaromatic hydrocarbons, including fuel oil #6 or kerosene, may be employed as a deinking composition component. These collector chemicals are slightly miscible in water and have a surface tension less than 50 dynes/cm, which enhance the agglomeration of the ink particles.

In addition, alternative process parameters may be employed in the invention, which include using the deinking composition with no pH adjustment to the wastepaper; using the deinking composition in an alkali pH range; or using the deinking composition in the presence of other chemicals suitably employed in a deinking and/or papermaking process such as bleaching agents, defoamers, sizing agents, brighteners, water quality processing agents among others.

Therefore, although the invention has been described with reference to certain preferred embodiments, it will be appreciated that other composite structures and processes for their fabrication may be devised, which are nevertheless within the scope and spirit of the invention as defined in the claims appended hereto.

We claim:

1. A method to deink impact or non-impact printed paper comprising the steps of:

repulping the printed paper in an alkali aqueous medium containing a deinking composition to form a pulp-containing medium;

wherein said deinking composition has hydrophobic-hydroprhilic balance values ranging from 0.5 to 12 and consists of a mixture of a nonionic surfactant selected from the group consisting of $C_5$–$C_{20}$ alcohol ethoxylates having an ethoxylate content sufficient to provide detergency or wetting and a $C_5$–$C_{20}$ alkanol; such that said alkanol and said alcohol ethoxylate are present in a ratio of at least 1:1, wherein the amount of said alkanol present is at least equal to or greater than the amount of said alcohol ethoxylate present;

wherein the presence of said deinking composition provides hydrogen bonding and/or liquid bridging between ink particles causing said ink particles to agglomerate to sizes greater than 100μ to produce an ink pulp medium; and separating agglomerated ink particles from said ink pulp medium through removal procedures consisting of screening and/or forward cleaning to produce a substantially ink free pulp medium.

2. The method as defined in claim 1, wherein said repulping of the printed paper is at consistencies in the range of 3–30%.

3. The method as defined in claim 1, wherein said alkali aqueous medium is maintained at a pH in the range of 6–11.5.

4. The method as defined in claim 1, wherein said deinking composition is present at a dosage ranging from between 0.1–2.0% by weight, calculated on the dry weight of the pulp used.

5. The method as defined in claim 1, wherein said alkali aqueous medium during repulping is maintained at temperatures in the range of 40°–80° C.

6. The method as defined in claim 1, comprising passing said ink pulp medium through a screen to remove coarse contaminants.

7. The method as defined in claim 6, comprising passing said ink pulp medium, at consistencies ranging from 0.3–3.0%, and temperatures from 25°–55° C. maintained at a pH range from 6.0–9.0, through slotted and pressurized screens to remove coarse contaminants.

8. The method as defined in claim 7, comprising passing said ink pulp medium through a number of passes of forward cleaners to remove ink particles denser than water to produce said substantially ink free pulp medium.

9. The method as defined in claim 8, wherein said forward cleaners are arranged in a primary-primary, primary-secondary, tertiary or quarternary arrangement.

10. The method as defined in claim 1, wherein said repulping is carried out for a time between 10 to 90 minutes at consistencies in the range of 3 to 30%.

11. The method as defined in claim 1, wherein said deinking composition provides hydrogen bonding, surface wetting and emulsification functionalities to agglomerate ink particles.

12. The method as defined in claim 1, wherein said alcohol ethoxylates have a hydroxyl value greater than 0.0001.

13. The method as defined in claim 1, wherein said deinking composition causes ink particles to agglomerate to sizes as large as ¼" (6000$\mu$) or greater.

14. The method as defined in claim 1, wherein said substantially ink free pulp medium has a speck removal and brightness level sufficient to produce high-grade recyclable paper.

* * * * *

UNITED STATES PATENT AND TRADEMARK OFFICE
CERTIFICATE OF CORRECTION

PATENT NO. : 5,876,559
DATED : March 2, 1999
INVENTOR(S) : Narendra R. Srivatsa and Richard R. Wesolowski It is certified that error appears in the above-identified patent and that said Letters Patent is hereby corrected as shown below:

On the cover page, at [56] References Cited, with respect to U.S. Patent 3,808,089 delete "Van" and insert --Von--.
At column 6, line 24, delete "hydrophobichydrophilic" and insert --hydrophobic-hydrophilic--.
At column 8, line 14, delete "0.1" and insert --0.01--.
At column 10, line 47, delete "3/8" and insert --3/4--.
At column 12, line 51, delete "hydroprhilic" and insert --hydrophilic--.

Signed and Sealed this

Twelfth Day of October, 1999

Attest:

Q. TODD DICKINSON

*Attesting Officer*    *Acting Commissioner of Patents and Trademarks*